United States Patent
Sasaki et al.

(10) Patent No.: US 7,614,050 B2
(45) Date of Patent: Nov. 3, 2009

(54) MACHINE AND METHOD FOR DEPLOYMENT OF OS IMAGE

(75) Inventors: Daisuke Sasaki, Ebina (JP); Hiroyuki Igata, Yamato (JP); Kenichi Akiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 947 days.

(21) Appl. No.: 11/041,195

(22) Filed: Jan. 25, 2005

(65) Prior Publication Data

US 2005/0223210 A1    Oct. 6, 2005

(30) Foreign Application Priority Data

Mar. 31, 2004  (JP) ............................... 2004-103263

(51) Int. Cl.
G06F 9/45 (2006.01)
(52) U.S. Cl. .......................................... 717/174; 713/2
(58) Field of Classification Search .................. 717/174; 712/2
See application file for complete search history.

(56) References Cited

U.S. PATENT DOCUMENTS 6,993,642 B2 *  1/2006  Burkhardt et al. .............. 713/1
2002/0010866 A1 *  1/2002  McCullough et al. ......... 713/201
2002/0194291 A1 *  12/2002  Najam et al. ................. 709/213
2005/0021727 A1  1/2005  Matsunami et al.
2008/0046708 A1 *  2/2008  Fitzgerald et al. .............. 713/2

FOREIGN PATENT DOCUMENTS

| JP | 10-133860 | 5/1998 |
|---|---|---|
| JP | 2002-278769 | 9/2002 |

* cited by examiner

*Primary Examiner*—John Chavis
(74) *Attorney, Agent, or Firm*—Antonelli, Terry, Stout & Kraus, LLP.

(57) ABSTRACT

Deployment technique that can distribute OS images at a high speed, and which includes a deployment machine (hereafter abbreviated to "DM"), a plurality of servers which are connected to the DM via a first communications network, and a storage system which is connected to the DM and the plurality of servers via a second communications network. The storage system includes a plurality of server storage devices that respectively correspond to the plurality of servers, and an original storage device in which an OS image is stored. The DM transmits a first instruction to produce the OS image inside the original storage device in each of the plurality of server storage devices to the storage system, and thereafter, the respective servers read the OS images in the server storage devices corresponding to themselves via the second communications network, and start the OS.

13 Claims, 8 Drawing Sheets

FIG. 2

SERVER CONTROL TABLE

| DEVICE NAME | MAC ADDRESS | OS IMAGE NAME | UNIQUE SETTING INFORMATION | VOLUME ID | BOOT PATH |
|---|---|---|---|---|---|
| DS | ····· | | | 1 | |
| FIRST SERVER | ····· | IMAGE 1 | ····· | 2 | ····· |
| SECOND SERVER | ····· | IMAGE 1 | ····· | 3 | ····· |
| THIRD SERVER | ····· | IMAGE 2 | ····· | 4 | ····· |
| ⋮ | ⋮ | ⋮ | ⋮ | ⋮ | ⋮ |

OS IMAGE TABLE

| OS IMAGE NAME | IMAGE FILE NAME | CONTENT |
|---|---|---|
| IMAGE 1 | Win2ksp1.img | SNMP SERVER, POP SERVER, .... |
| IMAGE 2 | LinuxSv.img | HTTP SERVER, FTP SERVER, .... |
| ⋮ | ⋮ | ⋮ |

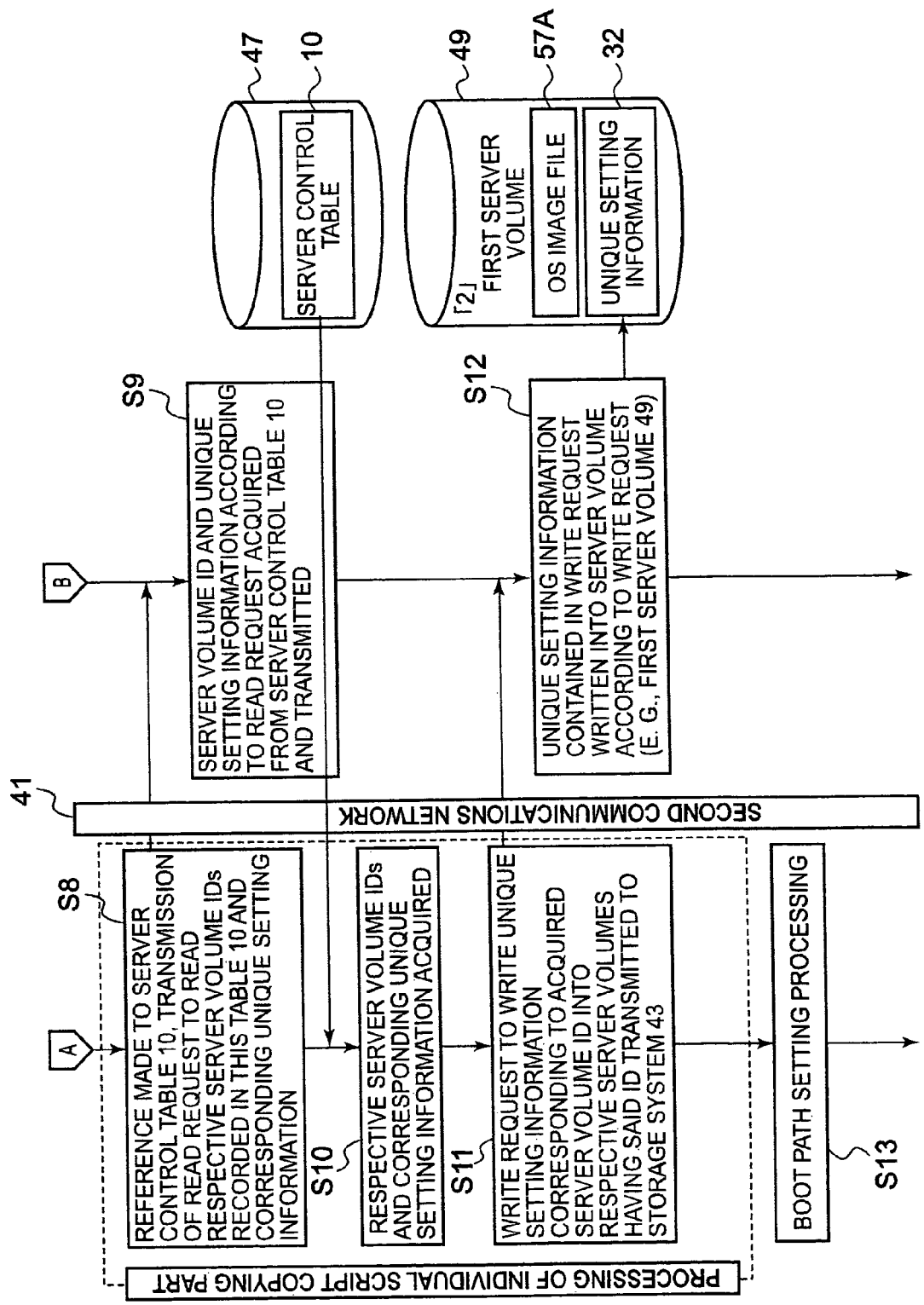

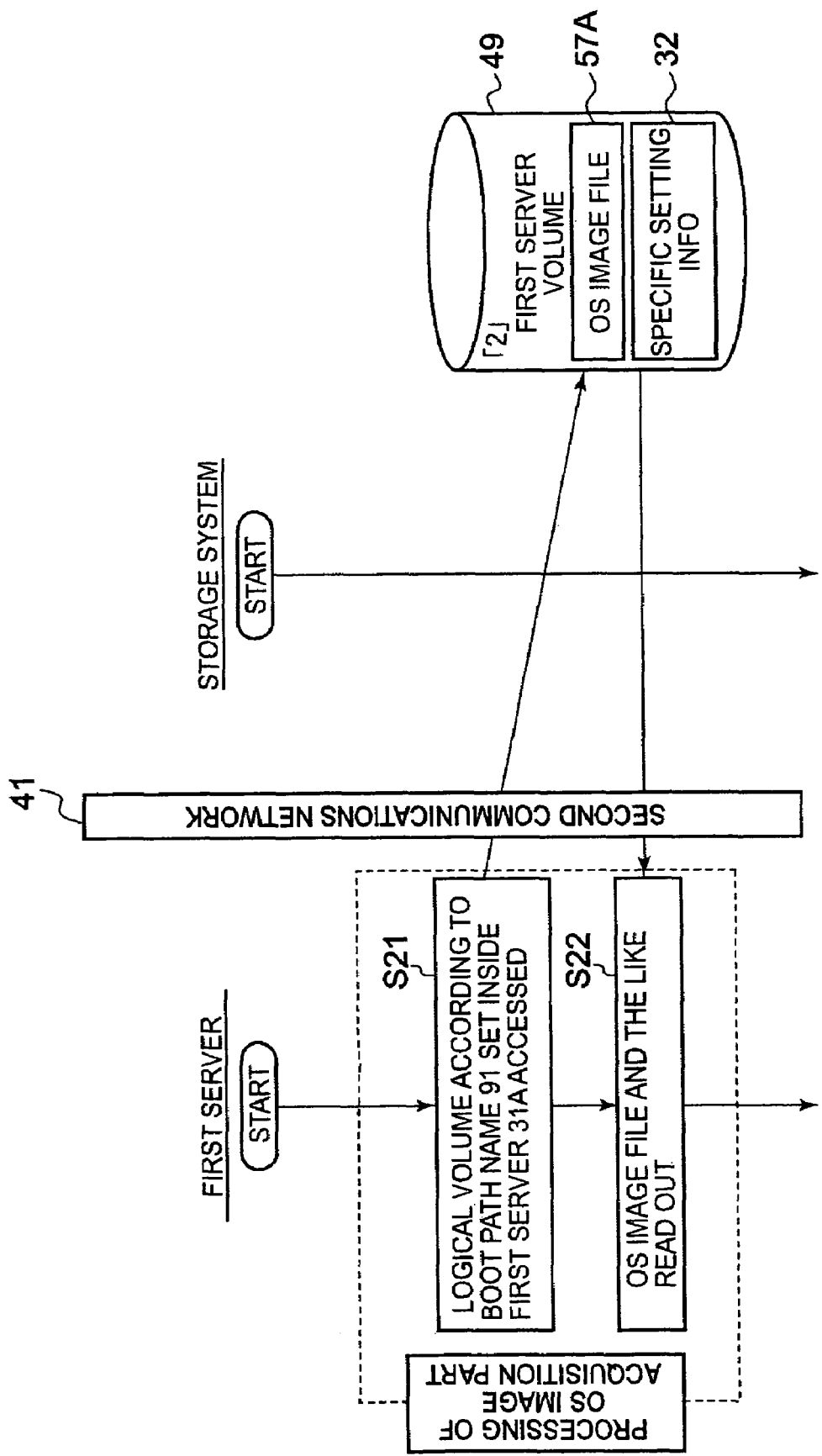

US 7,614,050 B2

MACHINE AND METHOD FOR DEPLOYMENT OF OS IMAGE

CROSS-REFERENCE TO PRIOR APPLICATION

This application relates to and claims priority from Japanese Patent Application No. 2004-103263, filed on Mar. 31, 2004 the entire disclosure of which is incorporated herein by reference.

BACKGROUND OF THE INVENTION

1. Field of the Invention

The present invention relates to a technique for providing an OS image to an information processing terminal via a communications network.

2. Description of the Related Art

For example, a technique in which a new OS (operating system) is produced in a plurality of installation destination computers from a new OS kernel and various types of drivers accommodated in an installation server, and the plurality of installation destination computers are restarted with the new OS thus produced, is disclosed in Japanese Patent Application Laid-Open No. 10-133860.

SUMMARY OF THE INVENTION

A technique in which an image (hereafter referred to as an "OS image") of the storage region in which the OS is installed is itself stored by the first information processing terminal instead of an OS kernel, and this first information processing terminal distributes this OS image to one or a plurality of second information processing terminals via an LAN, is conceivable.

In such a case, however, a large burden is placed on the LAN, and a considerable amount of time is required in order to complete the provision of the OS image. This applies to an even greater extent as the number of destinations to which OS images are provided increases.

Accordingly, it is an object of the present invention to provide a deployment technique that allows the rapid provision of OS images to OS image provision destinations. Other objects of the present invention will become clear from the following description.

The deployment machine of the present invention is a machine that prepares a plurality of OS images that are respectively used in a plurality of information processing terminals. This deployment machine is connected to a first communications network and a second communications network to which a plurality of information processing terminals and one or more storage systems are connected. This deployment machine comprises a volume preparation part, an OS image copying part, and a boot path setting part. The abovementioned volume preparation part causes the one or more storage systems to prepare a plurality of logical volumes for terminal use respectively corresponding to the abovementioned plurality of information processing terminals inside the abovementioned one or more storage systems. The abovementioned OS image copying part causes the abovementioned one or more storage systems to copy the OS image data stored in the logical volumes into each of the abovementioned one or more terminal logical volumes selected from the plurality of terminal logical volumes without passing through the first communications network, which has a slower transfer rate than the abovementioned second communications network. The boot path setting part is a part which sets a dedicated boot path for each of the one or more information processing terminals respectively corresponding to the abovementioned one or more terminal volumes; this part sets boot paths for accessing the abovementioned copied OS image data via the abovementioned second communications network.

Here, for example, the first communications network is an LAN. Furthermore, for example, the second communications network is an SAN. In other words, for example, the second communications network is a communications network which has a faster data transfer rate than the first communications network.

Furthermore, the plurality of terminal logical volumes may be prepared inside a single storage system, or may be prepared in two or more storage systems.

In a first embodiment of the deployment machine of the present invention, the abovementioned boot path setting part executes the processing of (1) or (2) below.

(1) One or more boot path names respectively corresponding to the abovementioned one or more information processing terminals are respectively transmitted to the abovementioned one or more information processing terminals via the abovementioned first communications network.

(2) In cases where access path names for the abovementioned terminal logical volumes are defined inside the abovementioned one or more storage systems, the abovementioned access path names are changed to boot path names that are set beforehand for the information processing terminals corresponding to the abovementioned terminal logical volumes.

In a second embodiment of the deployment machine of the present invention, in a case where the deployment machine transmits data via the abovementioned first communications network to an information processing terminal selected from the abovementioned one or more information processing terminals, if the power supply of the abovementioned selected information processing terminal is in an "off" state, the deployment machine transmits the abovementioned data to the abovementioned selected information processing terminal via the abovementioned first communications network after turning on the power supply of the abovementioned selected information processing terminal.

In a third embodiment of the deployment machine of the present invention, the abovementioned OS image data copying part executes the processing of (1) or (2) below.

(1) Two or more terminal logical volumes selected from the abovementioned plurality of terminal logical volumes are formed into a pair with each other, the OS image data inside the abovementioned logical volumes is read out via the abovementioned second communications network, and the abovementioned read-out OS image data is written all at one time via the second communication network into the two or more terminal logical volumes that are formed into a pair with each other.

(2) The abovementioned logical volume that stores OS image data and the abovementioned one or more selected terminal logical volumes are formed into a pair, and the abovementioned one or more storage systems are controlled so that the OS image data stored in the abovementioned OS image volume is copied all at one time into the abovementioned one or more terminal logical volumes.

Furthermore, for example, the processing of (1) is performed in cases where the OS image data is in a file format, and the abovementioned logical volume can be accessed by the deployment machine, but cannot be accessed by the information processing terminals. On the other hand, for example, the processing of (2) is performed in cases where the OS image itself is stored in one of the abovementioned logical volumes.

In a fourth embodiment of the deployment machine of the present invention, the deployment machine further comprises an information setting part. This information setting part sets unique setting information that is to be set in the information processing terminals in cases where the information processing terminals start the OS, this information being information that is contained in terminal information in a terminal control table in which a plurality of sets of terminal information respectively corresponding to the abovementioned plurality of information processing terminals, in each of the abovementioned one or more information processing terminals.

In a fifth embodiment of the deployment machine of the present invention, the abovementioned information setting part in the abovementioned fourth embodiment executes the processing of (1) or (2) below.

(1) The abovementioned acquired unique setting information is written into the terminal logical volume of the information processing terminal in which the abovementioned acquired specific information is to be set via the abovementioned second communications network.

(2) Information or a computer program that is used to set the abovementioned acquired unique setting information is transmitted to the information processing terminal in which the abovementioned acquired unique setting information is to be set via the abovementioned first communications network.

In a sixth embodiment of the deployment machine of the present invention, the abovementioned volume preparation part acquires the OS image data size and one or more different data sizes respectively corresponding to one or more different types of data stored in the terminal logical volume of the information processing terminal selected from the abovementioned plurality of information processing terminals, and prepares a logical volume which has a storage capacity that is equal to or greater than the total of the acquired OS image data size and the abovementioned one ore more different data sizes as the terminal logical volume of the abovementioned selected information processing terminal.

The abovementioned respective parts described for the first through sixth embodiments of the deployment machine of the present invention can be realized by means of hardware (e. g., electrical circuits or electronic circuits), computer programs or a combination of both hardware and computer programs.

The method of the present invention is a method for preparing a plurality of OS images that are respectively used in a plurality of information processing terminals. This method has first through third steps. In the first step, one or more storage systems connected to a first communications network and a second communications network are caused to prepare a plurality of terminal logical volumes respectively corresponding to the plurality of information processing terminals connected to the first communications network and the second communications network in one or more storage systems. In the second step, the one or more storage systems are caused to copy the OS image data stored in the logical volumes inside the one or more storage systems is copied into each of the one or more terminal logical volumes selected from the plurality of terminal logical volumes without passing through the abovementioned first communications network which has a slower transfer rate than the abovementioned second communications network. The third step is a step which sets a dedicated boot path for each of the one or more information processing terminals respectively corresponding to the abovementioned one or more terminal volumes; in this step, boot paths are set which are used to access the abovementioned copied OS image data via the abovementioned second communications network.

The computer program of the present invention is a computer program which is used to prepare a plurality of OS images that are respectively used by a plurality of information processing terminals. As a result of being read into a computer, this computer program causes the [abovementioned] first through third steps to be executed by this computer. In the first step, one or more storage systems connected to a first communications network and a second communications network are caused to prepare a plurality of terminal logical volumes respectively corresponding to the plurality of information processing terminals connected to the first communications network and the second communications network in the one or more storage systems. In the second step, the one or more storage systems are caused to copy the OS image data stored in the logical volumes inside the one or more storage systems into each of the one or more terminal logical volumes selected from the plurality of terminal logical volumes without passing through the first communications network whose transfer rate is slower than that of the second communications network. The third step is a step which sets a dedicated boot path for each of the one or more information processing terminals respectively corresponding to the abovementioned one or more terminal volumes; in this step, boot paths are set which are used to access the abovementioned copied OS image data via the abovementioned second communications network.

In the present invention, OS images can be quickly provided to OS image provision destinations.

BRIEF DESCRIPTION OF THE DRAWINGS

FIG. 2 shows one example of the server control table 10;

FIG. 3 shows one example of the OS image table 20;

FIG. 5 shows one example of the flow of OS image distribution in a deployment system constituting one embodiment of the present invention;

FIG. 7 shows one example of the flow of the processing that is performed in cases where an OS image file is read out.

DESCRIPTION OF THE PREFERRED EMBODIMENTS

Embodiments of the present invention will be described below with reference to the attached figures.

Figure 1:
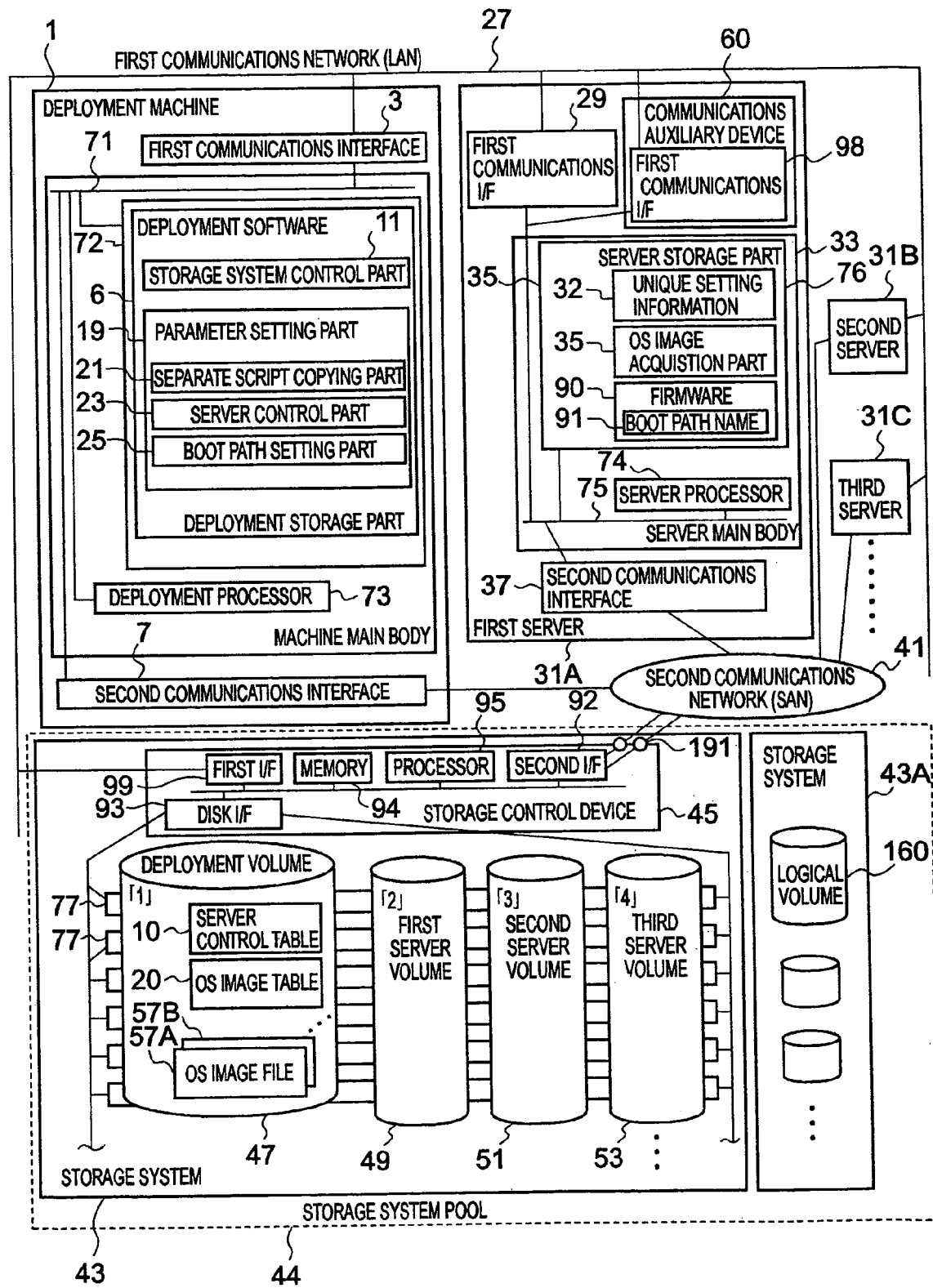
FIG. 1 shows an example of the overall construction of a deployment system constituting one embodiment of the present invention.

FIG. 1 shows an example of the overall construction of a deployment system constituting one embodiment of the present invention.

A deployment machine 1, a plurality of OS image provision destination servers (hereafter referred to simply as "servers") (three servers in the present embodiment) 31A through 31C, and a storage system pool 44 consisting of one or more storage systems 43, are connected to a first communications network (e. g., an LAN) 27. Furthermore, the deployment machine 1, plurality of serves 31A through 31C and storage system 44 are also connected to a second communications network (e. g., an SAN (Storage Area Network)) 41. The second communications network 41 is a communications network that is capable of higher-speed data communications than the first communications network 27.

For example, the deployment machine 1 is an information processing device such as a personal computer or the like. The deployment machine 1 comprises a first communications interface 3 for the first communications network 27, a second communications interface 7 for the second communications network 41, and a machine main body 5. The machine main body 5 is connected to the first communications interface 3 and second communications interface 7, and comprises (for example) a deployment processor (e. g., a CPU) 73 and a deployment storage part 72. The information processing device performs function as a deployment machine 1 by virtue of an arrangement in which deployment software 6 stored in the deployment storage part 72 is read into the deployment processor 73.

For example, the deployment software 6 is a type of application software that operates in the OS (not shown in the figures) of the deployment machine 1 (software that is booted from a hard disk inside the machine 1 or a specified logical volume inside the storage system 43), and comprises a storage control part 11 and a parameter setting part 19.

The storage system control part 11 performs control of the storage system 43 from the first communications interface 3 via the first communications network 27 (or from the second communications interface 7 via the second communications network 41). In concrete terms, for example, the storage system control part 11 transmits multiplex pair commands that form two or more logical volumes selected from a plurality of logical volumes into groups (in other words, pairs or multiple pairs) to the storage system 43, or transmits pair forming commands that form a first logical volume and a second logical volume into a pair and copies the data inside the first logical volume into the second logical volume to the storage system 43. Furthermore, as will be described later, the term "logical volume" refers to a logical storage device disposed in a plurality of disk type storage devices 77 inside the storage system 43.

The parameter setting part 19 executes server-specific setting processing that is used to set unique setting information relating to the OS image of the server into each of the plurality of servers 31A through 31C. For example, the term "server-specific setting processing" refers to processing that includes both the processing of (1) and the processing of (2) described below.

(1) Processing which is devised so that unique setting information for use by the server (e. g., specific parameters or an individual starting execution script described later) is transmitted to a server selected from the plurality of servers 31A through 31C (e. g., the server 31A, hereafter referred to as the "target server 31A"), or unique setting information 32 for used by the server is registered in the logical volume 49 used by the target server 31A, and this unique setting information 32 is provided to and set in the target server 31A as a result of the unique setting information 32 in the logical volume 49 being read out to the target server 31A.

(2) Processing in which the server boot path 91 is transmitted to the target server 31A.

The parameter setting part 19 comprises an individual script copying part 21, a boot path setting part 25 and a server control part 23.

The individual script copying part 21 acquires unique setting information for the respective servers (e. g., specific parameters or individual starting execution script) from a specified storage region in the deployment machine 1 or storage system 43 (e. g., a server control table 10 described later), and writes this information into a logical volume used for the server (this unique setting information may be transmitted to the storage system 43 so as to be copied into this logical volume used for the server; as a result, the unique setting information may be copied into the logical volume used for the server).

The boot path setting part 25 performs processing that sets a boot path 91 specific to the target server 31A in this target server 31A via the first communications interface 3. In concrete terms, for example, the boot path setting part 25 performs processing that sets a boot path 91 that is specific to the target server 31A in the firmware 90 of this target server 31A by rewriting all or part of the firmware 90 that is stored in a specified storage region inside the target server 31A (e. g., a storage region in a flash ROM). Furthermore, for example, a method in which the content of the path defined inside the storage system 43 (the content of the path between the server and the logical volume) is altered may be used instead of this boot path setting method. In concrete terms, for example, the abovementioned storage system control part 11 may acquire the boot path defined inside the target server 31A from a specified storage region (e. g., the server storage part 76 inside the target server 31A or the server control table 10 inside the storage system 43), and may alter the content of the path defined inside the storage system 43 (the content of the path between the server and the logical volume) on the basis of this acquired boot path (e. g., may alter the content of the path defined inside the storage control device 45 to a content which is the same as that of the acquired boot path).

The server control part 23 controls the respective servers 31A through 31C via the first communications interface 3. In concrete terms, for example, the server control part 23 transmits commands that are used to execute rebooting to the target server, or transmits power supply control commands (e. g., commands that are used to turn the power supply off (or to execute a power saving mode) and/or commands that are used to turn the power supply on (e. g., magic packets according to a Wake On LAN technique)). As a result, the target server executes rebooting in accordance with the content of the received command, or executes specified OS starting processing (e. g., processing that reads out various types of data from the logical volume in accordance with the boot path defined by the deployment machine 1) by turning the power supply off (or executing a power saving mode) and/or turning the power supply on.

The above has been a description of the deployment machine 1. Furthermore, the deployment machine 1 can control the storage device 43 (or another storage device 43A), set server-specific booth paths for the for the respective servers 31A through 31C, and transmit data unrelated to the deployment of the OS to the servers 31A through 31C or storage system 43, via the first communications network 27; however, it is not necessary that all of these operations be performed via the same network path. For example, in cases where the boot path setting part 25 sets the boot path for the target server 31A, this may be set via the first communications interface (e. g., LAN interface) 98 located in the communications auxiliary device 60 of the target server 31A.

Next, the respective servers 31A through 31C will be described.

Each of the plurality of servers 31A through 31C reads out and starts the OS image from the logical volume assigned to this server by performing booting according to the boot path stored in a specified storage region of the server itself in response to a specified command (e. g., a reboot execution command) from the deployment machine 1.

The first server 31A will be described as a typical example of the plurality of servers 31A through 31C. The first server 31A comprises a first communications interface (e. g., an LAN card corresponding to a Wake On LAN) 29 for the first communications network 27, a communications auxiliary device 60, a second communications interface 37 for the second communications network 41, and a server main body 33.

For example, the communications auxiliary device 60 may be an externally attached device (e. g., an LAN card), or may be attached directly to the mother board of the first server 31A. The communications auxiliary device 60 comprises another first communications interface (e. g., an LAN controller corresponding to a Wake On LAN) 98 for the first communications network 27. For example, the communications auxiliary device 60 can control the power supply of the server main body 33 by receiving power supply control commands (e. g., commands that are used to turn the power supply off (or to execute a power saving mode) and/or commands used to turn the power supply on (e. g., magic packets according to the Wake On LAN technique)) from the server control part 23 of the deployment machine 1. Furthermore, for example, the communications auxiliary device 60 can perform at least one function of information acquisition, setting or control for the first server 31A. In concrete terms, for example, the communications auxiliary device 60 can acquire server information recorded in the server control table 10 described later (e. g., server discriminating information, unique setting information and the like), and set parameters in the first server 31A (e. g., set the boot path 91 in the firmware 90), from a remote location.

The server main body 33 is connected to the first communications interface 29, the communications auxiliary device 60 and the second communications interface 37. For example, the server main body 33 comprises a server processor 74 (e. g., a CPU), and a server storage part 76.

The server storage part 76 includes a memory (e. g., a RAM or ROM (for instance, a flash ROM)) or a hard disk, or both. For example, unique setting information received from the individual script copying part 21 of the deployment machine 1 is registered in the server storage part 76. Furthermore, for example, firmware (e. g., BIOS) 90 which has the OS boot path name 91 of the server 31A, and an OS image acquisition part 35, are stored in the server storage part 76. The OS image acquisition part 35 is a computer program, e. g., a bootstrap loader, which executes booting in accordance with the boot path 91 registered in the server storage part 76. The OS image acquisition part 35 may be built into the firmware, or may exist separately from the firmware.

For instance, the server processor 74 reads out and starts the OS image inside the first server 31A from the first server volume 49 by reading in the OS image acquisition part 35 stored in the server storage part 76 (or memory installed in the second communications interface 37).

Next, the storage system 43 and other storage system 43A will be described. Furthermore, since the storage system 43 and other storage system 43A have substantially the same construction, the storage system 43 will be described as an example.

For instance, the storage system 43 is an RAID (Redundant Array of Independent Inexpensive Disks) system which is constructed by disposing numerous disk type storage devices (physical disks) 77 in the form of an array. The storage system 43 comprises a plurality of logical volumes disposed in one or more disk type storage devices 77, and a storage control device 45 which controls communications between the deployment machine 1 and plurality of servers 31A through 31C (hereafter referred to collectively as a "higher device") and the abovementioned plurality of logical volumes.

For example, the plurality of logical volumes include a deployment volume 47 which is assigned to the deployment machine 27, a first server volume 49 which is assigned to the first server 31A, a second server volume 51 which is assigned to the second server 31B, and a third server volume 53 which is assigned to the third server 31C. Logical volume IDs (e. g., numbers) which are used for immediate specification of the logical volumes are assigned to the respective logical volumes. In FIG. 1, the logical volume ID for each logical volume is shown in [Japanese style] brackets [indicated as quotation marks in English translation]. Specifically, it is seen in FIG. 1 that the logical volume ID for the first server logical volume is "2".

The deployment volume 47 is a logical volume that can be referred to by the deployment machine 1. A server control table 10, OS image data 20 and one or more OS image files 57A and 57B are stored in this deployment volume 47.

The server control table 10 is used to control the deployment machine 1 and the respective servers 31A and 31B. In concrete terms, for example, as is shown in FIG. 2, this table contains server information corresponding to the deployment machine 1 and to each of the plurality of servers 31A through 31C. For instance, the server information for the respective servers 31A through 31C (and the deployment machine 1) contains server discriminating information (e. g., device name and/or MAC address) for the server in question), the OS image name of the OS image file corresponding to this server, unique setting information set in this server, ID of the logical volume to which this server can refer, and boot path used to start this server. For instance, the unique setting information for each server includes specific parameters such as IP address, gateway address and the like, and is set in the server by a method such as reading the OS image in which this unique setting information is incorporated into the server, or reading the information out by means of the deployment machine 1, and transmitting the information to the server via the first communications network 27.

Furthermore, the unique setting information registered in the server control table 10 may be the starting execution script itself that is created so as to set the specific parameters, or may be information (pointers) that indicates the location of the specific parameters or starting execution script. For instance, server discriminating information, OS image names and unique setting information are registered beforehand in the server control table 10, and when a server volume is prepared, the ID of this server volume is additionally registered. Furthermore, other information such as the server volume ID or the like may also be registered beforehand (in other words, a completed server control table 10 may be prepared beforehand). Furthermore, in cases where one or more other storage systems 43A are connected inside the storage system table 44, information relating to servers (not shown in the figures) that read out OS image files from the logical volumes 160 inside these one or more other storage systems 43A may also be registered in this server control table 10. Furthermore, information relating to servers (not shown in the figures) that acquire OS image files via the first communications network 27 rather than the second communications network 41 may also be registered in this server control table 10. In other words, information relating to servers that acquire OS image files via the second communications network 41 and information relating to servers that acquire OS image files via the first communications network 27 may be mixed in the server control table 10.

The OS image table 20 is used to control one or more OS image files prepared inside the storage system 43 (e. g., inside the deployment volume 47). For example, as is shown in FIG.

3, one or more sets of OS image information respectively corresponding to one or more OS image files are contained in the OS image table 20. For instance, the OS image information for each OS image file includes the OS image name, the name of the OS image file, and the content and ID relating to the OS image file. Furthermore, for example, it is sufficient even if only the OS image name (or other OS image discriminating information) and the OS image file name (or other information specifying the location of the OS image file) are contained in the OS image information.

The corresponding OS image itself and one or more attributes relating to the OS image (e. g., the OS image data size or the like) are noted in each of the one or more OS image files 57A and 57B.

For example, the storage control device 45 comprises a first I/F 99 which is in interface for the first communications network 27, a second I/F 92 which is an interface for the second communications network 41, one or more processors (e. g., MPUs (Micro-Processing Units) or CPUs (Central Processing Units)) 95 which execute processing or the like in accordance with various types of commands from the higher device, a memory 94 which has a buffer region or the like in which data received from the higher device is temporarily stored, and a disk I/F 93 which is an interface for the disk type storage devices 77. For example, in response to various types of commands from the deployment machine 1, the storage control device 45 (e. g., the processor 95) constructs a new logical volume in a disk type storage device, or places the deployment volume 47 and one or more server volumes (e. g., the two server volumes 49 and 51) in a pair state, copies the OS image file inside the deployment volume 47 (e. g., the OS image file 57A) into the one or more server volumes, and dissolves the abovementioned pair state.

Figure 4:
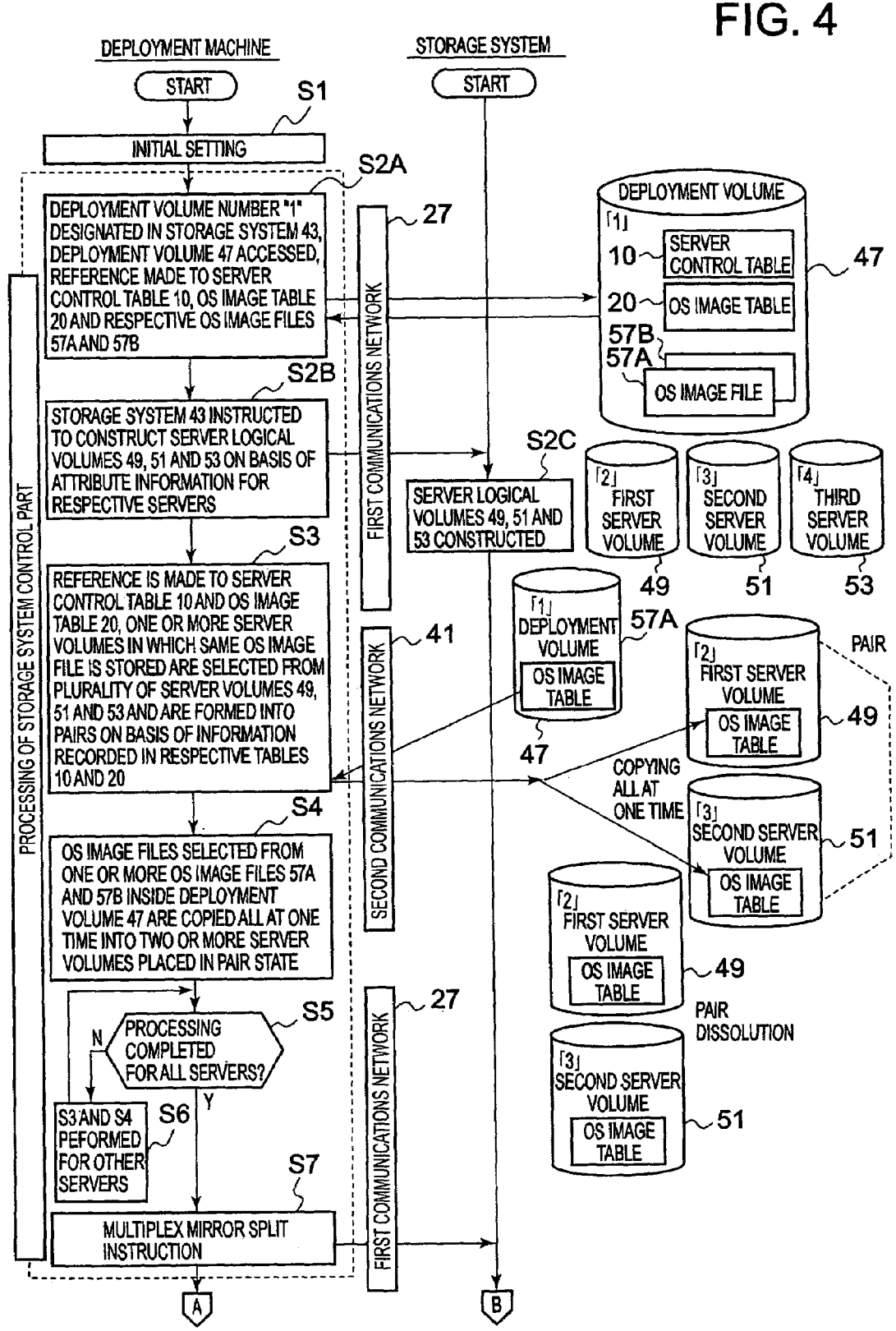
FIG. 4 shows one example of the flow of OS image distribution in a deployment system constituting one embodiment of the present invention.

The above has been a description of the overall construction of the deployment system of the present embodiment. Below, an example of the flow up to the point where the OS image is distributed to the respective servers in this system will be described with reference to FIG. 4 and following figures.

The deployment machine 1 executes various types of processing such as initial setting and the like (step S1), and starts its own OS. Furthermore, in cases where the machine 1 receives a start command for the deployment software (hereafter abbreviated to "DS") 6 from the user, the DS 6 is read into the CPU and prepared above the OS.

The DS 6 receives a multiplex mirror instruction for the user. When the DS 6 receives a multiplex mirror instruction from the user, the storage system control part 11 of the DS 6 executes multiplex mirror instruction transmission processing.

In concrete terms, the storage system control part 11 of the DS 6 first indicates the deployment volume ID "1" to the storage system 43 via the first communications network 27 (or second communications network 41), accesses the deployment volume 47, and refers to the server control table 10, OS image table 20 and respective OS image files 57A and 57B (S2A).

Then, the storage system control part 11 instructs the storage system 43 to construct the server logical volumes 49, 51 and 53 for each server on the basis of various types of attribute information for the servers (e. g., the size of the OS image data recorded in the OS image file corresponding to the OS image name of the server, the data size of the unique setting information for the server and the like) (S2B). As a result, respective server logical volumes 49, 51 and 53 based on the attribute information for each server are newly constructed in the disk type storage device(s) 77 by the storage control device 45 of the storage system 43 (S2C). Furthermore, for example, the logical volume IDs of the respective server logical volumes 49, 51 and 53 thus constructed may be IDs that are provided to the DS 6, or IDs that are provided to the processor 95 of the storage control device 45. Furthermore, for example, the logical volume IDs thus provided are written into places corresponding to the respective servers in the server control table 10 by the DS 6 via the first I/F 99 or second I/F 92 of the storage control device 45. Moreover, for example, in cases where the storage system control part 11 constructs a first server logical volume 49 corresponding to the first server 31A, the storage system control part 11 constructs a server logical volume which has a storage capacity that is greater than the total of the data size of the OS image data contained in the attribute information corresponding to this first server 31A and the data size of the specific setting data and the like. Furthermore, the attribute information for each server can be stored in a specified storage region in the deployment machine 1 or storage system 43 (e. g., the server control table 10 shown for example in FIG. 2).

Next, on the basis of the information recorded in the server control table 10 and OS image table 20, the storage system control part 11 of the DS 6 selects two or more (e. g., two) server volumes 49 and 51 in which the same OS image file is stored from the plurality of server volumes 49, 51 and 53, and forms the volumes into a pair with each other (S3). In other words, the storage system control part 11 of the DS 6 forms the abovementioned two selected server volumes into a mirror volume.

Next, on the basis of the server control table 10 and OS image table 20, the storage system control part 11 of the DS 6 selects the OS image file 57A stored in the two server volumes 49 and 51 (formed into a pair) from the one or more OS image files 57A and 57B inside the deployment volume 47. Then, the storage system control part 11 of the DS 6 successively copies the selected OS image file 57A as an image in block units into the pair of the two server volumes 49 and 51 all at one time (S4). In concrete terms, for example, the storage system control part 11 of the DS 6 reads out the selected OS image file 57A via the second communications network 41, and transmits the read-out OS image file 57A via the second communications network to the mirror volume consisting of the two server volumes 49 and 51 that were formed into a pair. As a result, the transmitted OS image file 57A is written all at one time into the two server logical volumes 49 and 51 constituting the abovementioned pair by the storage control device 45.

The storage system control part 11 of the DS 6 repeats the processing of S3 and S4 until this processing is completed for all of the servers 31A through 31C (N in S5, S6). The storage system control part 11 may perform the processing of S3 and S4 successively for each of the respective OS images, or may perform this processing in parallel. Furthermore, in the example described above, the number of server volumes formed into a pair with each other is two; however, in cases where the number of server volumes in which the same OS image file is stored is three or greater, these three or more server volumes may be formed into pairs with each other, and the same OS image file may be copied all at one time into these three or more server volumes.

When the processing of S3 and S4 is completed for all of the servers 31A through 31C (Y in S5), OS image files corresponding to these servers are prepared in the respective server volumes 49, 51 and 53 corresponding to the respective servers 31A through 31C. At this point in time, the OS image files themselves (of the respective servers) are not in a state that is suited to the servers (in other words, if the unique setting information of the servers is not set inside the server volumes or inside the servers, OS starting that is suited to the servers cannot be performed).

After Y is obtained in S5, the storage system control part 11 of the DS 6 transmits a multiplex mirror split instruction to the storage system 43, so that the pair state of the abovementioned two server volumes 49 and 51 is dissolved (S7).

Following S7, the DS 6 executes processing that is used to input the unique setting information for each server into the respective servers.

In concrete terms, for example, as is shown in FIG. 5, the individual script copying part 21 in the parameter setting part 19 of the DS 6 refers to the server control table 10, and transmits a read request to read the respective server volume IDs recorded in this table 10, and the corresponding unique setting information (e. g., specific parameters or starting execution script), to the storage system 43 via the second communications network 41 (or first communications network 27) (S8). The storage control device 45 acquires the server volume ID and unique setting information according to the read request from the server control table 10, and transmits this information to the deployment machine 1 via the second communications network 41 (or first communications network 27) (S9). As a result, the individual script copying part 21 acquires the server volume ID and unique setting information for each server (S10).

Next, the individual script copying part 21 transmits a write request to write the unique setting information corresponding to the respective acquired server volume IDs (e. g., "2") into the respective server volumes having this ID to the storage system 43 via the second communications network 41 (S11). The storage control device 45 writes the unique setting information contained in the write request into the server volume according to the write request (e. g., the first server volume 49) (S12). As a result, the unique setting information corresponding to the respective servers is registered in the server logical volumes of these servers.

Next, for example, the boot path setting part 25 in the parameter setting part 19 of the DS 6 sets the boot path of the OS image file of the server for each of the plurality of servers 31A through 31C (S13). For example, the following two methods are conceivable as methods for setting the boot path.

Figure 6A:
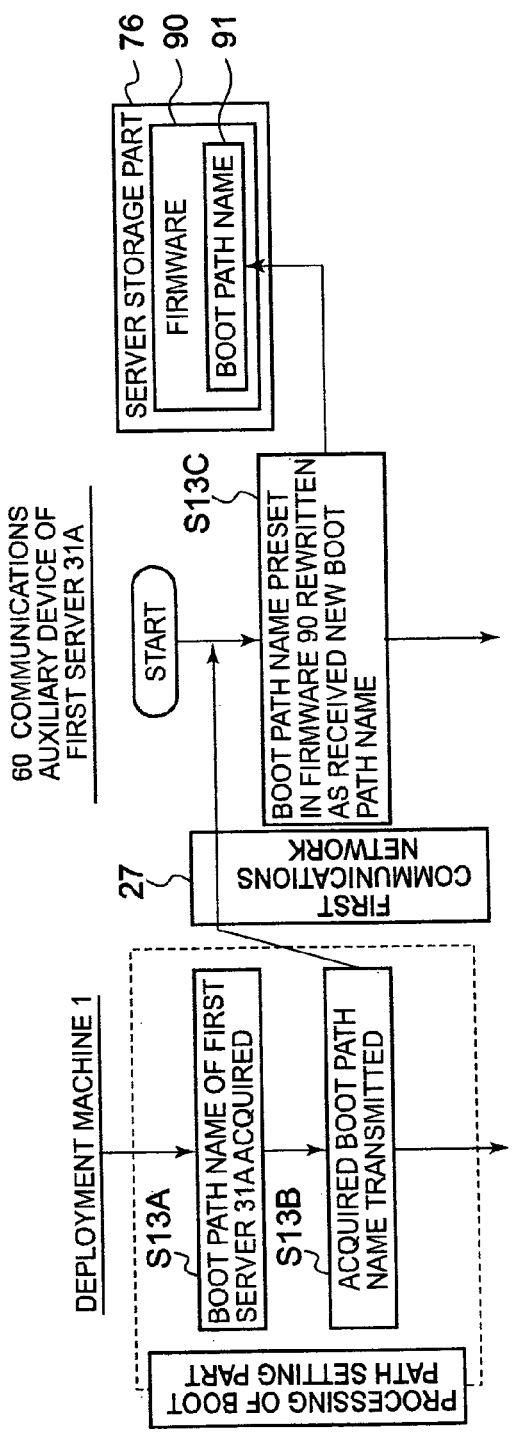
FIG. 6 is a diagram which is used to explain the boot path setting method.
Figure 6B:
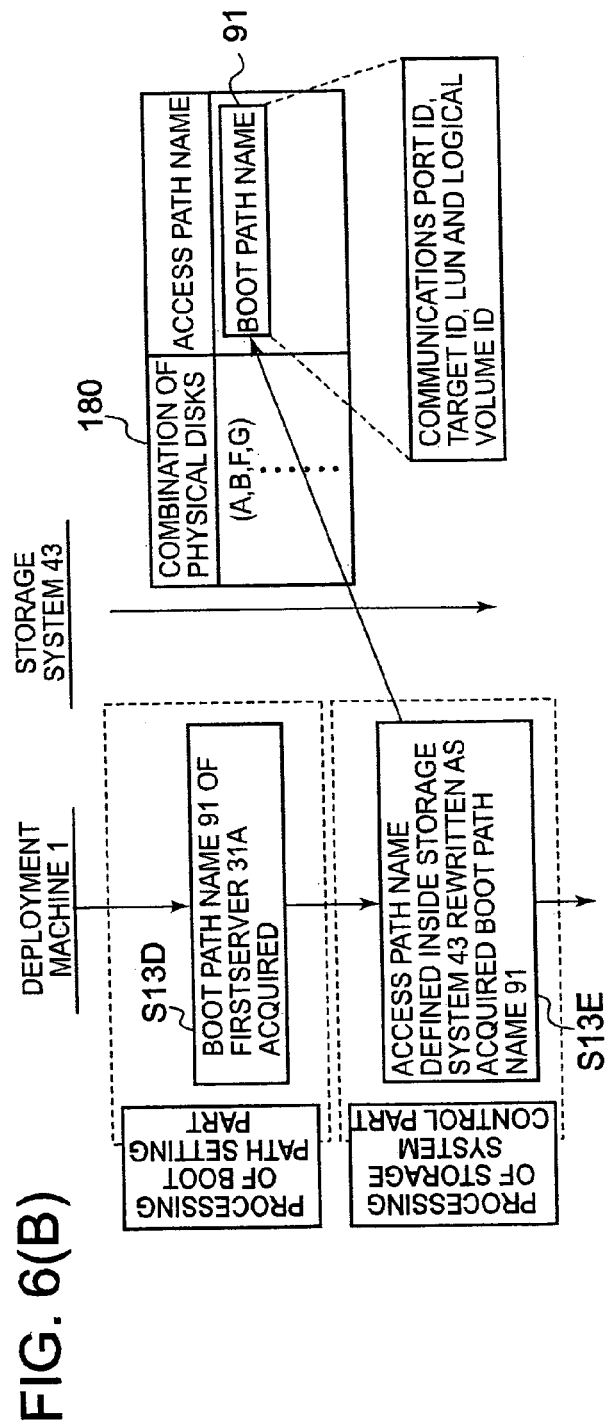

FIG. 6 is a diagram which is used to illustrate the boot path setting method. In concrete terms, FIG. 6 (A) is an explanatory diagram of a first boot path setting method, and FIG. 6 (B) is an explanatory diagram of a second boot path setting method. Below, these methods will be described in order. Furthermore, in the following description, a case in which the boot path of the first server 31A is set will be taken as an example.

(1) First Boot Path Setting Method

The boot path setting part 25 reads out the new boot path name of the first server 31A recorded in the server control table 10, or sends an instruction to the user via the DS 6 (S13A). Furthermore, for example, this new boot path name may be a name recorded beforehand by the system manager of the storage system 43 using the DS 6, or may be a name that is written by the storage system control part 11 of the DS 6 following the copying processing of S4.

The boot path setting part 25 transmits the acquired boot path name of the first server 31A to the communications auxiliary device 60 of the first server 31A via the first communications network 27 (S13B). As a result, the communications auxiliary device 60 rewrites the boot path name 91 used by the firmware 90 inside the first server 31A as the received new boot path name (S13C).

Furthermore, in this first boot path setting method, in cases where the power supply of the server prior to the setting of the boot path is in an "off" state, the boot path setting part 25 may perform the processing of S13B after turning the power supply of the server main body 33 on by a remote operation using the server control part 23 (e. g., by transmitting a magic packet). Moreover, if the system is arranged so that the server can receive a new boot path and set this boot path inside its own apparatus even if the power supply of the server main body 33 is in an "off" state, it is not necessary to turn on the power supply by a remote operation.

(2) Second Boot Path Setting Method

For example, as is shown in FIG. 6 (B), an access path name is defined beforehand for each of a plurality of logical volumes inside the storage system 43 (e. g., in the memory 94 of the storage control device 45). In concrete terms, for example, a volume control table 180 in which respective access path names corresponding to respective logical volumes (combinations of physical disks) are recorded is provided inside the storage system 43. Furthermore, the respective alphabetic characters "{A, B, F, G}", which constitute one example of a combination of physical disks, are IDs that are assigned to the physical disks. Moreover, the access path names can be constructed in various ways; for example, a construction including the ID of the communications port 191 in the storage system 43 that is connected to the second communications network 41, the target ID belonging to this communications port ID, the LUN (Logical Unit Number) belonging to this target ID and the logical volume ID belonging to this LUN may be used.

The boot path setting part 25 acquires the boot path name (e. g., information having a construction similar to that of the abovementioned access path name) 91 corresponding to the first server 31A (S13D). The acquired boot path name 91 may be a name that is received from the first server 31A, or may be a name that is recorded beforehand in the server control table 10.

Next, the storage system control part 11 of the DS 6 accesses the storage system 43, and performs processing that changes the access path name including the logical volume ID of the first server volume 49 (among the plurality of access path names recorded in the volume control table 180) to the boot path name 91 acquired in S13D (S13E). As a result, even if the first server 31A subsequently accesses the storage system 43 in accordance with the preset boot path name 91, the first server 31A can access the first server volume 49, and can read out the OS image that has been copied into this volume 49.

When the boot path setting part 25 has set a new server boot path for each server, the processing is ended. Furthermore, after the boot path setting part 25 has set the new boot paths, the server control part 23 transmits start commands to the respective servers 31A through 31C (e. g., transmits these commands all at one time); as a result, the system may be set so that booting is executed according to the new boot paths in the respective servers 31A through 31C, and so that the plurality of OS image files respectively corresponding to the plurality of servers 31A through 31C are provided to the plurality of servers 31A through 31C all at one time. Below, the flow of the processing that is performed when the servers read out OS image files will be described using the first server 31A (among the plurality of servers 31A through 31C) as an example.

FIG. 7 shows the flow of the processing that is performed in a case where the first server 31A reads out the OS image file 57A.

In a case where the first server 31A starts after a new boot path has been set, the OS image acquisition part 35 of this server 31A accesses the logical volume indicated by the boot path name 91 set in the server storage part 76 (S21). Since the boot path name of the first server 31A is set by the method described with reference to FIG. 6, the OS image acquisition part 35 accesses the first server volume 49 as a result of S21. The OS image acquisition part 35 reads out the OS image file 57A and the unique setting information 32 from the first server volume 49 (S22), so that the OS is started by the server. For example, the unique setting information (e. g., specific parameters such as the IP address, gateway address and the like) is set by the firmware 90 (e. g., BIOS).

The above has been a description of the flow up to the point where the OS image is distributed to the respective servers. Furthermore, this flow is the flow of the processing used to distribute the OS image to all of a plurality of servers 31A through 31C; however, it would also of course be possible to apply this flow in cases where the OS image is distributed to only a single server.

In the embodiment described above, the system does not depend on the band of the first communications network (e. g., an LAN), so that the OS image can be distributed to a plurality of servers in a shorter time than in a conventional technique.

As was described above, the above embodiment is merely a single embodiment of the present invention; in this embodiment, a number of modifications such as those described below are conceivable.

For example, in a first modification, the deployment machine 1 may read OS image files corresponding to the respective servers (e. g., compressed files) from a logical volume (subsequently performing (for example) thawing and freezing processing), and may write these OS image files into the server logical volume via the second communications network 41. Furthermore, the storage system control part 11 of the DS 6 may copy the OS image file inside the deployment volume 47 of the storage system 43 into the logical volume 160 inside another storage system 43A.

In a second modification, there may be an on-line state in which higher devices corresponding to logical volumes are in a state that allows access, and an off-line state in which even higher devices corresponding to the logical volumes are in a state that does not allow access, in the respective logical volumes. For example, the question of whether the respective logical volumes are in an on-line state or an off-line state can be determined according to whether volume state bits respectively corresponding to the plurality of logical volumes are "1" or "0". The respective volume state bits may be recorded in a memory inside the storage control device 45. The storage control device 45 may perform the abovementioned copying processing on the basis of the server control table 10 after preparing a plurality of server volumes and switching the respective server volumes to the [abovementioned] off-line state all at one time (i. e., after switching the volumes to a state in which the volumes cannot be accessed from any higher device). Subsequently, the storage control device 45 can dissolve the abovementioned pair state, either on its own account or in response to a "split" command from the DS 6. In this case, the storage control device 45 may switch the server logical volume into which the OS image file has been copied from the off-line state to the on-line state (e. g., may alter the volume state bit from "0" to "1") at a specified timing (e. g., immediately after the dissolution of the pair state).

In a third modification, at least the server control table 10 (among the server control table 10 and the OS image table 20) may be stored outside the storage system 43 rather than inside the deployment volume 47, e. g., inside the deployment storage part 72 of the deployment machine 1 (for example, in a data storage volume used by the DS 6 in an internally installed hard disk).

Figure 8:
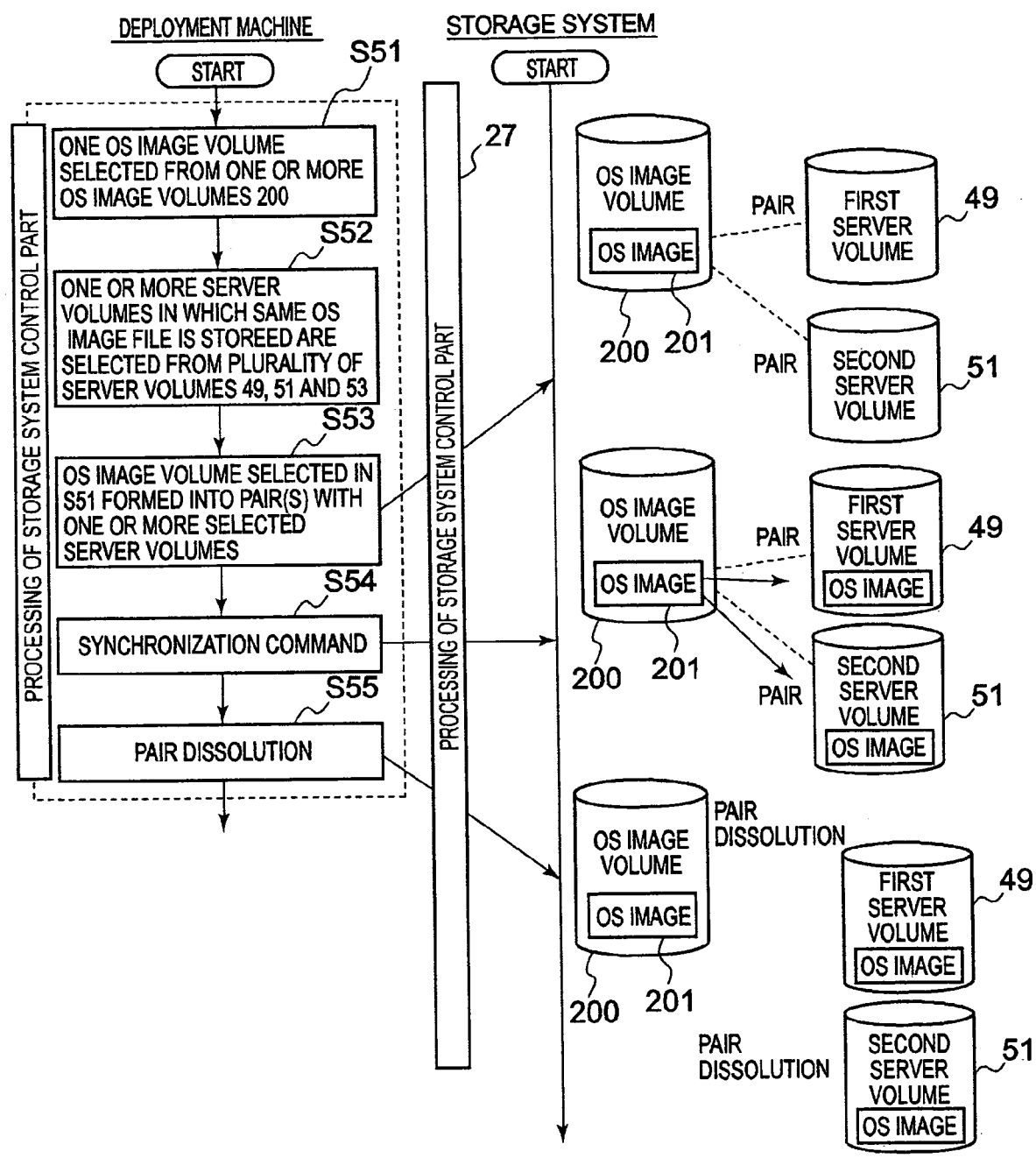
FIG. 8 shows the flow of the OS image copying processing in a fourth embodiment.

In a fourth modification, the OS image may be prepared as a volume rather than in a file format. In this case, for example, the copying of the OS image may be performed by the processing flow shown in FIG. 8.

Specifically, the storage system control part 11 of the DS 6 selects the OS image volume in which the OS image that is the object of copying is stored from one or more OS image volumes (logical volumes in which OS images are present) 200 inside the storage system 43 (S51).

Furthermore, the storage system control part 11 selects one or more (e. g., two) server volumes 49 and 51 that are the copying destinations of the OS image that is the object of copying from the plurality of server volumes 49, 51 and 53 (S52).

Next, the storage system control part 11 forms the OS image volume 200 selected in S51 and the one or more server volumes 49 and 51 selected in S52 into pairs (S53). Then, the storage system control part 11 transmits a synchronizing command to the storage system 43 (S54). As a result, the OS image inside the OS image volume 200 is copied all at one time by the storage control device 45 into the one or more server volumes 49 and 51 that form pairs with this OS image volume 200.

After copying is completed, the storage system control part 11 of the DS 6 dissolves the pairs formed in S53 (S55).

Furthermore, for example, in S53, it is not absolutely necessary that pairs may be formed between two volumes; multiple pairs may also be formed among three or more volumes. In this case, since the same data is stored in corresponding address blocks of the three or more volumes, the OS image can be written into the three or more server volumes formed into pairs in a time that is substantially equal to a single OS image writing time.

Embodiments and modifications of the present invention have been described above. However, these are merely examples used to illustrate the present invention; the scope of the present invention is not limited to these embodiments and modifications alone. The present invention may be embodied in various other forms. For example, the present invention is not limited to the above description as long as a correspondence is established between the boot path names set for the servers and the access path names of the server logical volumes.

What is claimed is:

1. A deployment machine which prepares a plurality of OS images that are respectively used in a plurality of information processing terminals, the deployment machine being coupled to a first communications network and a second communications network to which a plurality of information processing terminals and one or more storage systems are connected, the deployment machine comprising:

a volume preparation part which causes said one or more storage systems to prepare a plurality of terminal logical volumes respectively corresponding to said plurality of information processing terminals, inside said one or more storage systems;

an OS image copying part which causes said one or more storage systems to copy the OS image data stored in the logical volumes into each of the one or more terminal logical volumes selected from said plurality of terminal logical volumes without passing through said first communications network, which has a slower transfer rate than said second communications network; and a boot path setting part that sets a dedicated boot path for each of the one or more information processing terminals respectively corresponding to said one or more terminal volumes, and which sets boot paths that are used to access said copied OS image data via said second communications network which is a different network from said first communications network, and wherein said second communications network operates with a higher speed performance than said first communications network.

2. The deployment machine according to claim 1, wherein said boot path setting part executes the processing of (1) or (2) below:
(1) one or more boot path names respectively corresponding to said one or more information processing terminals are respectively transmitted to said one or more information processing terminals via said first communications network; or
(2) in cases where access path names for said terminal logical volumes are defined inside said one or more storage systems, said access path names are changed to boot path names that are preset for the information processing terminals corresponding to said terminal logical volumes.

3. The deployment machine according to claim 1, wherein in cases where data is transmitted to an information processing terminal selected from said one or more information processing terminals, if the power supply of said selected information processing terminal is in an "off" state, said data is transmitted to selected information processing terminal via said first communications network after the power supply of said selected information processing terminal is turned on.

4. The deployment machine according to claim 1, wherein said OS image data copying part executes the processing of (1) or (2) below:
(1) two or more terminal logical volumes selected from said plurality of terminal logical volumes are formed into a pair with each other, the OS image data inside said logical volumes is read out via said second communications network, and said read-out OS image data is written all at one time via said second communications network into said two or more terminal logical volumes that are formed into a pair with each other; or
(2) said logical volume storing the OS image data and said one or more selected terminal logical volumes are formed into a pair, and said one or more storage systems are controlled so that the OS image data inside said OS image volume is copied all at one time into said one or more terminal logical volumes.

5. The deployment machine according to claim 1, comprising an information setting part which sets unique setting information that is contained in terminal information in a terminal information table in which a plurality of sets of terminal information respectively corresponding to said plurality of information processing terminals are recorded, and that is to be set in said information processing terminals when said information processing terminals start the OS, in the information processing terminals in which said unique setting information is to be set.

6. The deployment machine according to claim 5, wherein said information setting part executes the processing of (1) or (2) below:
(1) said acquired unique setting information is written into the terminal logical volumes of the information processing terminals in which said acquired unique setting information is to be set via said second communications network; or
(2) information or a computer program that is used to set said acquired unique setting information, is transmitted to the information processing terminals in which said acquired unique setting information is to be set via said first communications network.

7. The deployment machine according to claim 1, wherein said volume preparation part acquires the OS image data size and one or more different data sizes respectively corresponding to one or more different types of data stored in the terminal logical volume of the information processing terminal selected from said plurality of information processing terminals, and prepares a logical volume having a storage capacity that is equal to or greater than the total of the acquired OS image data size and said one or more different data sizes as the terminal logical volume of said selected information processing terminal.

8. A method carried out by at least one processor device, for preparing a plurality of OS images that are respectively used in a plurality of information processing terminals, comprising:
causing one or more storage systems connected to a first communications network and a second communications network, to prepare a plurality of terminal logical volumes respectively corresponding to said plurality of information processing terminals coupled to the first communications network and the second communications network in said one or more storage systems;
causing said one or more storage systems to copy OS image data stored in the logical volumes inside said one or more storage systems in each of the one or more terminal logical volumes selected from said plurality of terminal logical volumes, without passing through said first communications network whose transfer rate is slower than that of said second communications network; and
setting a dedicated boot path for each of said one or more information processing terminals respectively corresponding to said one or more terminal volumes, wherein the boot paths are for accessing said copied OS image data via said second communications network which is a different network from said first communications network, and wherein said second communications network operates with a higher speed performance than said first communications network.

9. The method according to claim 8, wherein the processing of (1) or (2) below is executed in the setting of the boot paths:
(1) one or more boot path names respectively corresponding to said one or more information processing terminals are respectively transmitted to said one or more information processing terminals via said first communications network; or
(2) in cases where access path names for said terminal logical volumes are defined inside said one or more storage systems, said access path names are changes to boot path names that are preset in the information processing terminals corresponding to said terminal logical volumes.

10. The method according to claim 8, wherein the processing of (1) or (2) below is executed in said copying operation:
(1) two or more terminal logical volumes selected from said plurality of terminal logical volumes are formed into a pair with each other, the OS image data inside said logical volumes is read out via said second communications network, and said read-out OS image data is written all at one time into said two or more terminal logical volumes that are formed into pairs with each other via said second communications network; or (2) said logical volume in which the OS image data is stored and said one or more selected terminal logical volumes are formed into a pair with each other, and said one or more storage systems are controlled so that the OS image data inside said OS image volume is copied all at one time into said one or more terminal logical volumes.

11. The method according to claim 8, comprising setting unique setting information that is included in terminal information in a terminal control table in which a plurality of sets of said terminal information respectively corresponding to said plurality of information processing terminals, and that is to be set in said information processing terminals when said information processing terminals start the OS, in each of said one or more information processing terminals.

12. The method according to claim 11, wherein the processing of (1) or (2) below is executed in the setting operation:
(1) one or more boot path names respectively corresponding to said one or more information processing terminals are respectively transmitted to said one or more information processing terminals via said first communications network; or
(2) in cases where access path names for said terminal logical volumes are defined inside said one or more storage systems, said access path names are changed to boot path names that are preset in the information processing terminals corresponding to said terminal logical volumes.

13. A storage device embodying a computer program which is used to prepare a plurality of OS images that are respectively used in a plurality of information processing terminals, where the program carried out by a computer causes the computer to execute:

causing one or more storage systems coupled to a first communications network and a second communications network to prepare a plurality of terminal logical volumes respectively corresponding to said plurality of information processing terminals connected to the first communications network and the second communications network in said one or more storage systems;

causing said one or more storage systems to copy the OS image data stored in the logical volumes inside said one or more storage systems into each of the one or more terminal logical volumes selected from said plurality of terminal logical volumes without passing through said first communications network whose transfer rate is slower than that of said second communications network; and setting a dedicated boot path for each of said one or more information processing terminals respectively corresponding to said one or more terminal volumes, wherein the boot paths are for accessing said copied OS image data via said second communications network which is a different network from said first communications network, and wherein said second communications network operates with a higher speed performance than said first communications network.

\* \* \* \* \*